United States Patent [19]
Veeneman et al.

[11] Patent Number: 5,625,562
[45] Date of Patent: Apr. 29, 1997

[54] INTERNAL BAR CODE READING APPARATUS

[75] Inventors: William J. Veeneman, Minneapolis; Phillip R. Brooks, Eagan, both of Minn.

[73] Assignee: The Gift Certificate Center, Inc., Minneapolis, Minn.

[21] Appl. No.: 593,020

[22] Filed: Jan. 29, 1996

Related U.S. Application Data

[63] Continuation of Ser. No. 210,145, Mar. 17, 1994, abandoned.

[51] Int. Cl.$^6$ .................................................. G06F 19/00
[52] U.S. Cl. .............................. 364/479.05; 364/479.07; 364/479.02; 235/381; 395/217; 395/224
[58] Field of Search ............................ 364/400, 401, 364/404–408, 428, 478, 471, 478.03, 478.04, 478.06, 478.08, 478.09, 478.15, 479.01, 479.02, 479.05, 479.07, 479.12; 235/381–383, 18, 379, 380; 902/21–23, 30

[56] References Cited

U.S. PATENT DOCUMENTS

| | | |
|---|---|---|
| 3,445,633 | 5/1969 | Ratner . |
| 3,622,995 | 11/1971 | Dilks et al. . |
| 3,804,007 | 4/1974 | Arciprete et al. . |
| 4,124,109 | 11/1978 | Bissell et al. .................. 194/4 |
| 4,166,945 | 9/1979 | Inoyama et al. . |
| 4,554,446 | 11/1985 | Murphy et al. . |
| 4,720,785 | 1/1988 | Shapiro . |
| 4,815,741 | 3/1989 | Small . |
| 4,949,256 | 8/1990 | Humble ........................ 364/401 |
| 5,014,212 | 5/1991 | Smith ........................... 364/479 |
| 5,021,967 | 6/1991 | Smith ........................... 364/479 |
| 5,029,099 | 7/1991 | Goodman ..................... 364/479 |
| 5,036,472 | 7/1991 | Buckley et al. .............. 364/479 |
| 5,038,293 | 8/1991 | Goodman ..................... 364/479 |
| 5,083,638 | 1/1992 | Schneider . |
| 5,119,293 | 6/1992 | Hammond ................... 364/401 |
| 5,132,915 | 7/1992 | Goodman .................... 364/479 |
| 5,160,171 | 11/1992 | Gregory et al. . |
| 5,192,854 | 3/1993 | Counts . |
| 5,208,445 | 5/1993 | Nahar et al. . |
| 5,243,174 | 9/1993 | Veeneman et al. ......... 235/381 |
| 5,327,066 | 7/1994 | Smith ............................ 320/2 |
| 5,349,534 | 9/1994 | Rousseff et al. ............ 364/479 |

FOREIGN PATENT DOCUMENTS

| | | |
|---|---|---|
| 0103759 | 3/1984 | European Pat. Off. . |
| 0150103 | 7/1985 | European Pat. Off. . |
| 0354260 | 2/1990 | European Pat. Off. . |
| 9300239 | 9/1994 | Netherlands . |
| 2211786 | 7/1989 | United Kingdom . |
| WO92/15968 | 9/1972 | WIPO . |
| WO89/05489 | 6/1989 | WIPO . |
| WO91/10216 | 7/1991 | WIPO . |

OTHER PUBLICATIONS

Patent Abstract of Japan, vol. 016, 580 (P-1461) Dec. 18, 1992 re JP 4-225468 of Aug. 14, 1992.
Patent Abstract of Japan, vol. 015, No. 260 (M-1131) Jul. 2, 1991 re JP 3-086564 of Apr. 11, 1991.

*Primary Examiner*—Paul P. Gordon
*Assistant Examiner*—Thomas E. Brown
*Attorney, Agent, or Firm*—Merchant, Gould, Smith, Edell, Welter & Schmidt

[57] ABSTRACT

A gift certificate dispensing device having an internal machine-readable indicia reader is disclosed for printing and dispensing a certificate either based upon payment by a user or upon the insertion of a pre-paid form into a slot in communication with the scanner. A plurality of gift certificate dispensing devices can be connected in a network under the control of a central processing unit. The central processing unit identifies and keeps track of all the certificates within the network by way of indicia disposed on the certificates, which are scanned by each device as they are dispensed therefrom.

14 Claims, 10 Drawing Sheets

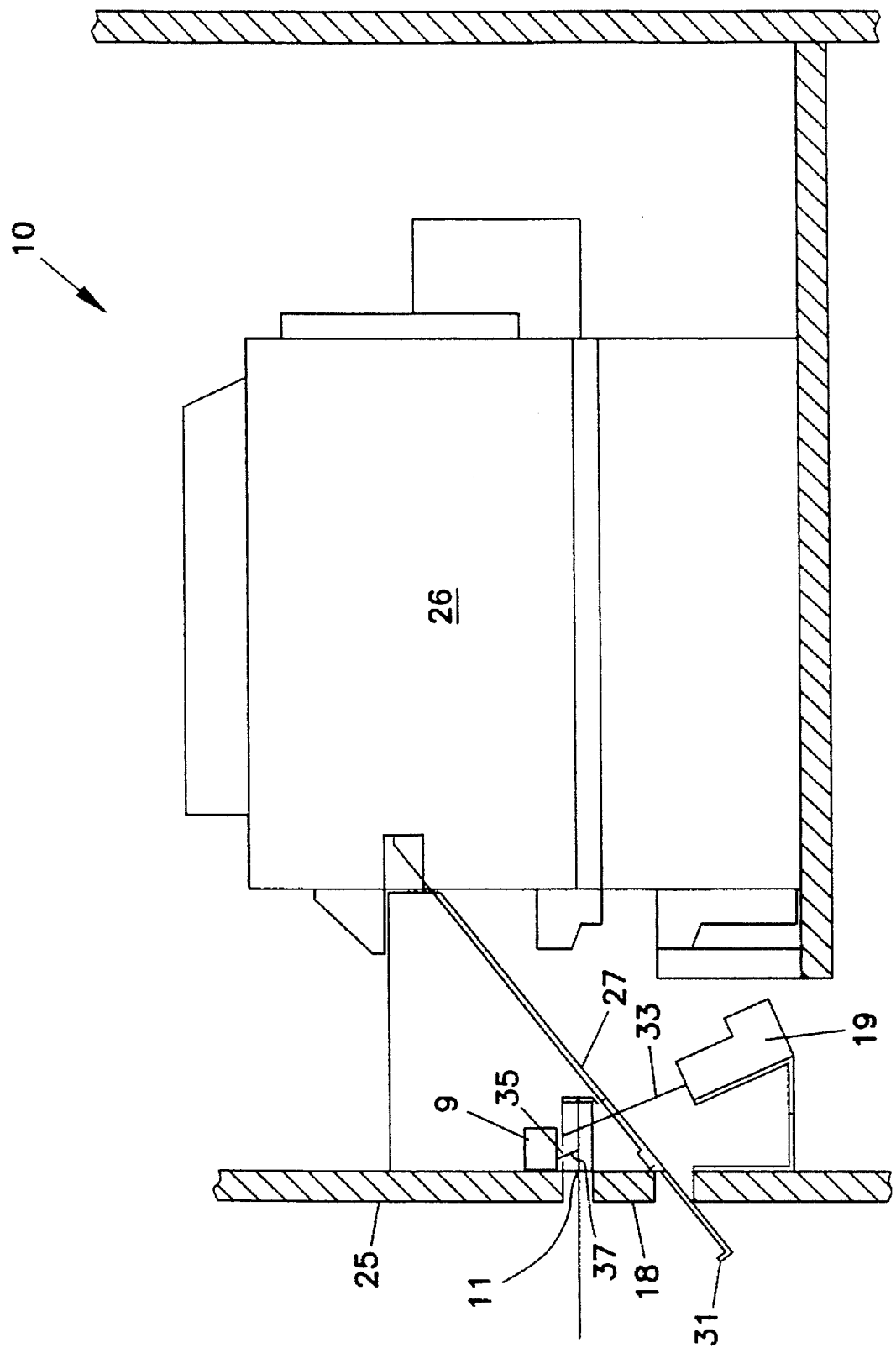

INTERNAL BAR CODE READING APPARATUS

This is a Continuation of application Ser. No. 08/210,145, filed Mar. 17, 1994, now abandoned.

FIELD OF THE INVENTION

The present invention relates to an apparatus and method for dispensing certificates, and more particularly, to an apparatus and method which includes reading machine-readable indicia, like barcodes.

BACKGROUND OF THE INVENTION

Certificate dispensing devices are becoming increasingly more popular as a means for replacing human operators. These devices are being implemented in a variety of applications, such as for vending airline tickets, conducting financial transactions (i.e., Automatic Teller Machines), and more recently dispensing gift certificates. A conventional gift certificate dispenser is disclosed in U.S. Pat. No. 5,243,174 and is incorporated herein by reference.

Certificate dispensing devices have several advantages over their human counterparts. First, since they require a minimal amount of direct human assistance, they are considerably cheaper to run. Second, they can be located outside and inside, such as in all-night convenience stores, grocery stores and gas stations, so as to provide users with unlimited access 24 hours a day, seven days a week. Third, these devices are mobile and can be placed in multiple locations. Such mobility allows a company to expand its geographic market for the goods and/or services sold by the device.

Despite these advantages, theft and vandalism of these devices and their contents has been a continuing problem and as a result, have increased the costs associated with the operation of such devices. In an attempt to prevent theft and vandalism, safety features have been incorporated into existing devices to detect unauthorized access to the interior of the housing of the device. One such feature is the use of access codes which are only distributed to authorized personnel.

The certificates dispensed by the dispenser, however, are typically stored within the interior of the housing of the device. As a result, someone must be allowed access to the interior of the housing in order to load and reload certificates into the device. Whenever the housing is open there is a potential for theft. For example, unauthorized personnel may have improperly obtained the access code. It is also possible that authorized personnel are the themselves stealing the certificates. As the number and geographic scope of these devices increases, the potential for such theft also increases.

In the gift certificate vending industry, additional problems are present. Gift certificates have emerged due to increasing time constraints in the lives of busy people. They have also become popular among companies as a quick and easy way to give gifts to their employees, such as for Christmas, or for Secretary's Day. Currently, employees receive a pre-ordered form from their employer and select a purveyor of goods/services from a list provided. The employee mails this filled-in form to the gift certificate vendor, who then issues a complete gift certificate payable to the employee in the appropriate gift amount and from the purveyor selected by the employee.

The current procedure, however, essentially eliminates the very benefits of gift certificates, namely convenience. In addition, since the form must be returned to the gift certificate vendor before the employee can redeem it, processing costs are increased. This procedure also increases the risk that the form may get lost, damaged, or misplaced since it requires the user to temporarily lose control of it. Furthermore, since the employee never uses the gift certificate dispenser, the opportunity for her/him to become aware of and familiar with the dispenser is lost.

Accordingly, there is a need for a certificate dispenser that can identify, track and validate the issuance of certificates therefrom in order to prevent theft. There is also a need for a certificate dispenser that dispenses a gift certificate in response to the insertion of a pre-ordered form.

SUMMARY OF THE INVENTION

The present invention is broadly directed to a dispensing arrangement requiring a first form negotiable for goods or services having first machine-readable indicia disposed thereon and a mechanism for dispensing the first form. The arrangement also includes a second form having second machine-readable indicia thereon and a mechanism for accepting the second form in at least partial payment for the first form. The dispensing mechanism and the accepting mechanism have a common machine-readable scanner for reading the first and second indicia. The arrangement further includes a mechanism for processing information from the first machine-readable indicia to identify a security problem and a mechanism for validating the second indicia before allowing the accepting mechanism to accept the second form as at least partial payment for the first form.

More particularly, the arrangement of the present invention comprises a housing having a wall with a slot therein. A certificate negotiable for goods or services has first-machine readable indicia disposed thereon. The arrangement includes a mechanism for receiving payment for the certificate. The payment receiving mechanism includes a form having a second machine-readable indicia disposed thereon and a machine-readable indicia scanner. The payment receiving mechanism also includes a mechanism for validating the second machine-readable indicia. The arrangement further includes a mechanism within the housing for dispensing the certificate, and a mechanism for guiding the certificate and the form so that the first indicia is scanned by the scanner when the certificate passes from the dispensing mechanism and so that the second indicia is scanned by the scanner when a portion of the form is inserted through the slot. The arrangement still further includes a mechanism for controlling the payment receiving mechanism and the dispensing mechanism. The controlling mechanism includes a first mechanism for processing and validating information from the payment receiving mechanism, and for regulating the dispensing mechanism so that the certificate is dispensed by the dispensing mechanism when the scanner reads the second machine-readable indicia and accepts the form as the payment on validation of the second machine-readable indicia. The controlling mechanism also then includes a second mechanism for processing information from the first machine-readable indicia to identify a security problem.

The present invention also provides for a method for dispensing a certificate having a first indicia disposed thereon from a certificate dispensing apparatus in response to receiving a payment from a user, or upon insertion of a form having second indicia disposed thereon into a slot provided on the apparatus. The dispenser machine has a sensor, a guide, a printer, a dispenser, a scanner, and a central processing unit. The method involves activating the printer upon verification by the central processing unit of the payment received, activating the scanner in response to the printer being activated or when the sensor senses the presence of the certificate being dispensed and the form being inserted in the slot dispensing the certificate after it has been printed by the printer, scanning one of the first and second indicia, as the printed certificate is dispersed by the dispersing nears, verifying through the central processing unit that the second indicia scanned by the scanner is valid to enable issuance of the certificate, and determining through the control processing unit that a security investigation need not be made when the first indicia is in proper sequence.

BRIEF DESCRIPTION OF THE DRAWINGS

FIG. 3A is a cross-sectional side view illustrative of the certificate dispenser of claim 1, with parts removed for clarity;

DETAILED DESCRIPTION OF THE PREFERRED EMBODIMENTS

Figure 1:
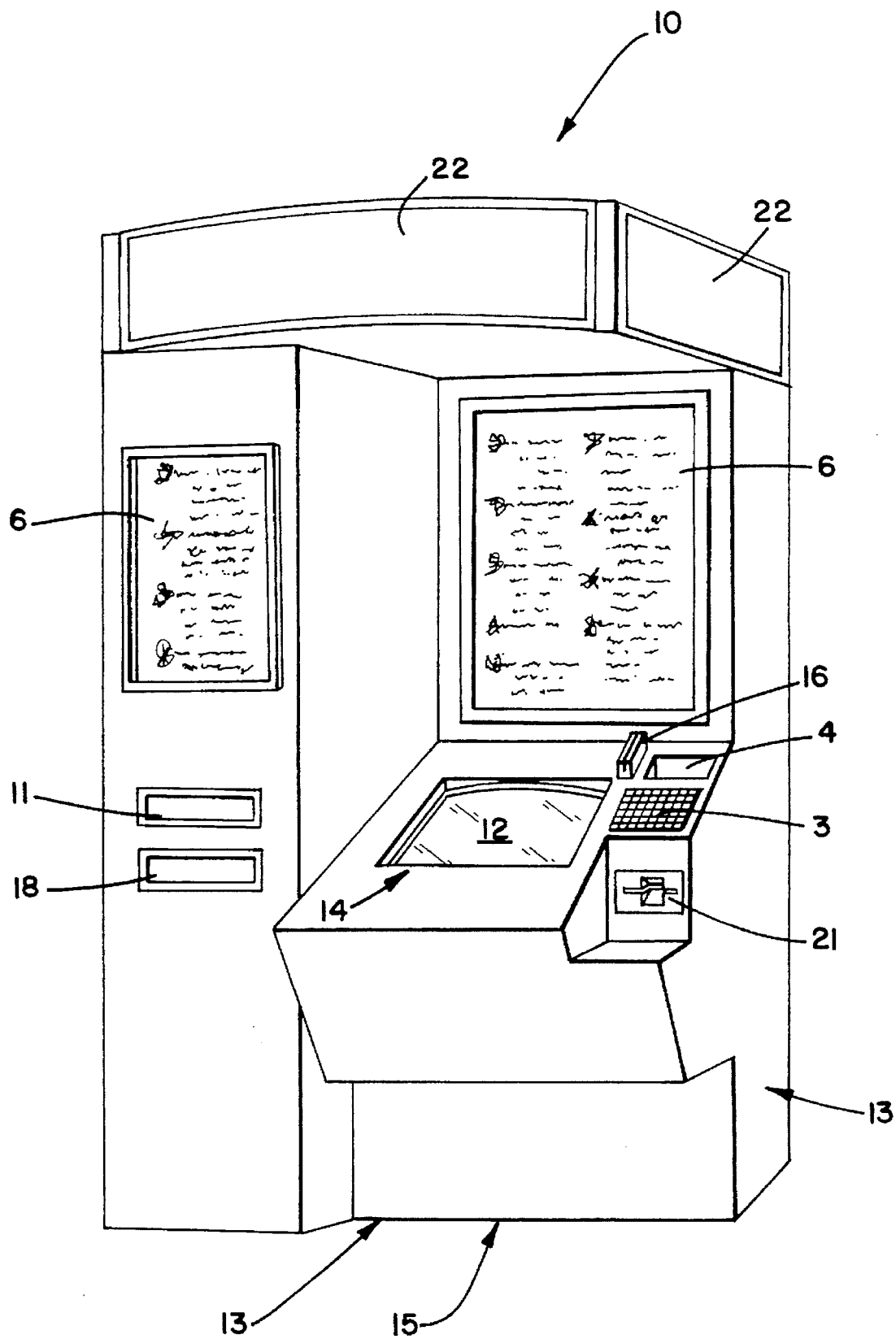
FIG. 1 is a perspective view of a gift certificate dispenser in accordance with the present invention.

A certificate dispensing device 10 is shown in FIG. 1. The dispensing device 10 shown in FIG. 1 is a gift certificate dispenser and the invention will be hereinafter described based on such a device. However, it can be appreciated that the invention can be applied to other types of dispensing devices, such as those used to vend airline tickets, vouchers, and the like. In general, device 10 can vend any certificate which is negotiable for goods and services.

Certificate dispensing device 10, as shown in FIG. 1, is a stand-alone housing having a rectangular shape with, panel-like walls 13, a base 15 and a top 17. Alternatively, dispensing device 10 may be built into a wall or like structure. Dispensing device 10 houses a monitor 12 with a touch screen 14, a magnetic card reader 16, a cash acceptor 21, a pre-paid form input slot 11, a certificate dispenser slot 18, an envelope dispenser slot (not shown), a pocket 4 for storing literature about device 10, a keypad 3, and identifying plaques 22 on one or more sides of the device. Device 12 may also be provided with a plurality of areas 6 upon which further information about device 10 may be displayed, such as instructions on how to use device 10 or a list of the names of the available purveyors. It is understood that only one form of payment is needed, i.e., card reader 16, cash acceptor 21, or pre-paid form receiver indicated at slot 11. Also, the envelope dispenser is optional.

Monitor 12 is the primary means for providing communication between the user and dispensing device 10. The user is able to enter information by touching predetermined areas of touch screen 14. The user may also enter information via keypad 3. Messages generated by dispensing device 10, such as instructions or advertising, may likewise be displayed to the user via monitor 12. Card reader 16 is used to accept a payment from the user via credit card or other card having magnetic-coded data thereon representing an account number or other designation which can be used for satisfying a demand for payment. Input slot 11 is aligned with a scanner 19 contained within the housing (see FIGS. 3A and 3B) which reads machine-readable indicia (barcodes, MICR, etc.) disposed on papers inserted into input slot 11.

In a representative transaction, a user will approach monitor 12, enter gift certificate choices via touch screen 14, such as the store and gift amount, swipe a credit card through card reader 16 or input cash to cash acceptor 21, and await printing and dispensing of the certificate and envelope from dispenser slot 18 and envelope dispenser slot 20, respectively.

Dispensing device 10, however, provides for other types of transactions. One such transaction is the redemption of a pre-ordered gift certificate having barcoded indicia disposed thereon for identifying the certificate. With this type of transaction, a user having a form representing a pre-ordered gift form will approach dispensing device 10, insert the portion of the form having the barcoded indicia disposed thereon into input slot 11, select a store and input his or her name from touch screen 14, and then await printing and dispensing of a complete certificate and envelope from certificate dispenser slot 18 and envelope dispenser slot 20, respectively.

Another type of transaction provided by dispensing device 10 is a sweepstake where users having sweepstake entry coupons with barcoded indicia disposed thereon can obtain prizes from dispensing device 10. With this type of transaction, a sweepstake entrant will approach dispensing device 10, insert the portion of the coupon having barcoded indicia disposed thereon into input slot 11, and then await instructions and/or information displayed on monitor 12 indicating whether or not they have won, and if so, how to claim their prize, perhaps a gift certificate from dispensing device 10. While they are waiting, monitor 12 preferably displays information about the gift certificate dispenser.

Figure 2:
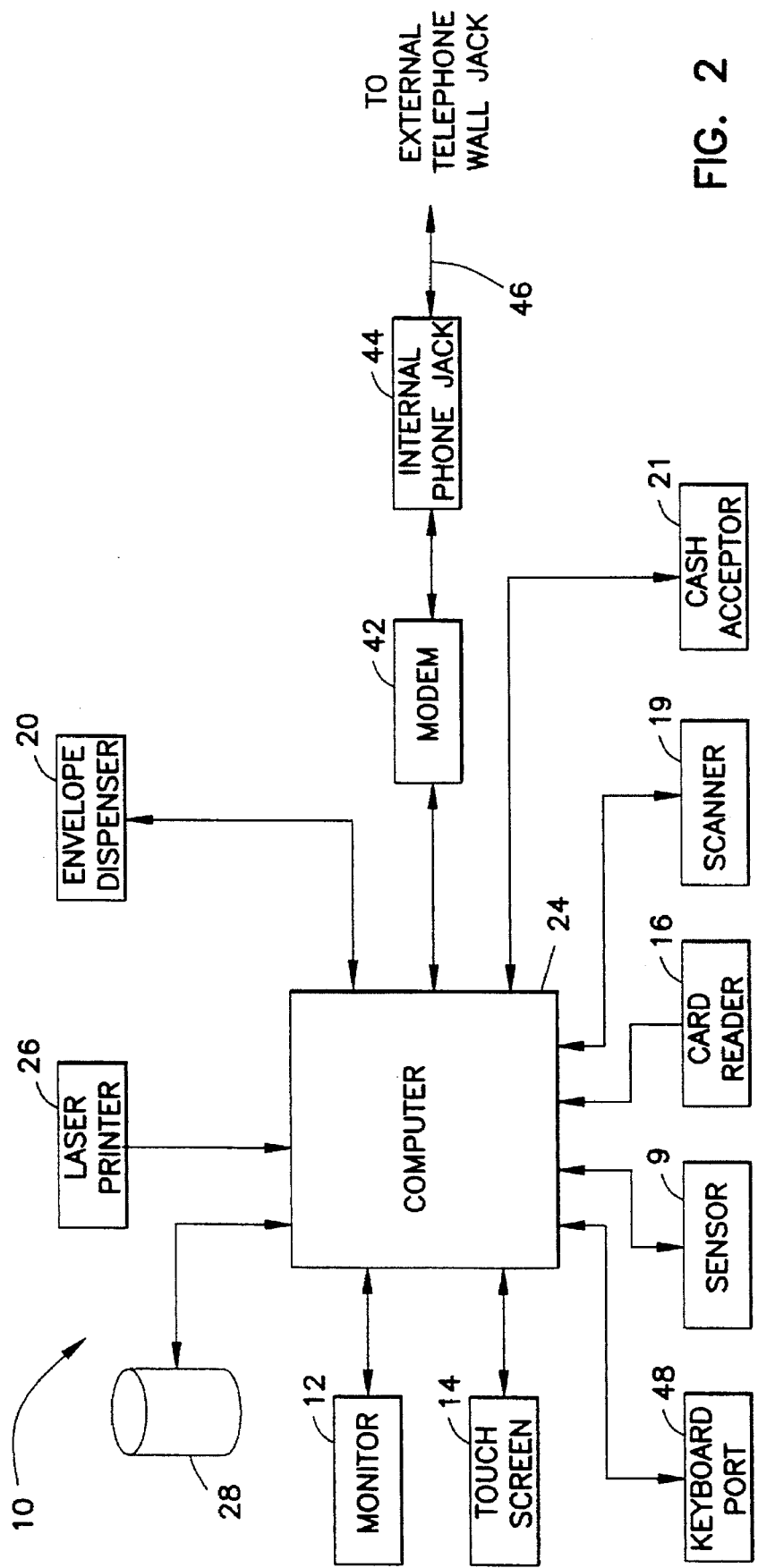
FIG. 2 is an electrical block diagram representative of the gift certificate dispenser according to the present invention.

The various electronics which provide the advantageous features of dispensing device 10 are secured behind an access door (not shown) within the housing. FIG. 2 shows an electrical block diagram of the gift certificate dispensing device 10 of FIG. 1. Computer 24 is connected to and controls monitor 12, touch screen 14, card reader 16, sensor 9, scanner 19, cash acceptor 21, a laser printer 26, envelope dispenser 32, a nonvolatile memory device 28, and a modem 42. Modem 42 is connected through an internal telephone jack 44 to a public telecommunications channel 46. Computer 24 is also connected to a keyboard port 48 to allow connection of a keyboard (not shown) during servicing. Dispensing device 10 also preferably includes a plurality of safety devices connected to computer 24 (not shown). A dispensing device having these safety devices is disclosed in U.S. Pat. No. 5,243,174.

In the preferred embodiment, computer 24 is an IBM PC or compatible computer with at least 2 MBytes of dynamic memory. Monitor 12 is a standard VGA monitor. Touch screen 14 is an Elographics' AccuTouch 2742-13-K1 touch screen with touch screen controller. Card reader 16 is a MAGTEK 21055002 slotted magnetic card reader connected to computer 24 through an RS232 line. Sensor 9 is an Optek Technology, Inc. Reflective Object Sensor Model OP B704. Scanner 19 is a Symbol Technologies LS-2920 connected to computer 24 through an RS232 line. Laser printer 26 is a Hewlett Packard Series III laser printer. Nonvolatile memory device 28 is a 40 MByte fixed disk drive. Modem 42 is a 9600 Baud Motorola Codex Model 3500 modem. Telephone jack 44 is a standard jack compatible with a standard domestic telephone cable. Cash acceptor 21 is a CBV Model IVO with a bill stacker. All these items are commercially available as is known to those skilled in the art.

Card reader 16 is a typical magnetic card reader used to read coded data stored in a magnetic strip on a credit card in order to debit a credit card account for payment for gift certificates dispensed. Card readers such as card reader 16 contain circuitry which reads the encoded data and sends that data to computer 24 for use in validating the card. Alternatively, a card reader with an integral modem (not shown) may be used to automatically dial a credit card service for verification of a credit card passed therethrough. It should be noted that although the preferred embodiment is geared toward the use of a credit card, the teaching of the present invention could also easily be applied to a debit card system.

Scanner 19 as shown in FIG. 2 is a typical machine-readable indicia scanner used to scan and read barcoded indicia. With dispensing device 10, scanner 19 is used to scan and read indicia disposed on forms representing pre-ordered gift certificates or indicia disposed on sweepstakes entry forms when inserted into input slot 11. Scanner 19 is also used to scan and read indicia of printed certificates as they are dispensed from dispensing device 10. These indicia can either be pre-printed on the certificates to be stored within device 10, or they can be preprinted on the certificates by printer 26. Scanners such as scanner 19 contain circuitry which reads the indicia and sends that data to computer 24 for validating the pre-ordered gift certificate, coupon, and printed certificate. Preferably, scanner 19 can read a variety of computer-readable indicia, including magnetic-type indicia. One example of such a scanner is manufactured by Verifone. By implementing such a scanner, input slot 11 is available to accept pre-paid forms. As a result, card reader 16 can be eliminated, thereby simplifying, if desired, the design of dispensing device 10. In addition, by increasing the number of types of indicia accepted by dispensing device 10, its utility and functionality can be greatly increased.

Figure 3B:
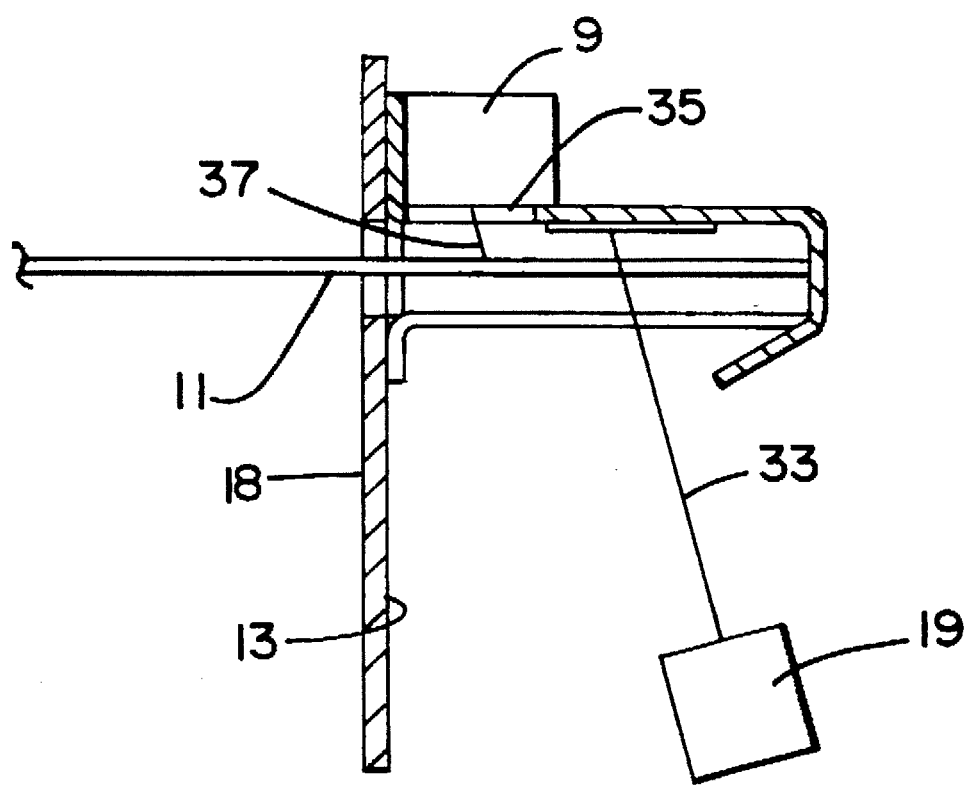
FIG. 3B is a transverse cross-section of the area surrounding the input slot of FIG. 3A with a form inserted therein.

As can best be seen in FIG. 3A, scanner 19 is placed between laser printer 26 and the front; wall 25 of the housing. A guide 27 extends between printer 26 and certificate dispenser slot 18 in front wall 25. The printed certificate is fed onto guide 27 and slides downwardly along it through certificate dispenser slot 18 and against stop 31. The user can grasp the certificate in the region near stop 31 and remove it. As can be further seen in FIG. 3B, an opening 33 is provided in guide 27 such that scanner 19 projects a laser beam appropriately through opening 33 to illuminate a machine-readable indica disposed either on a certificate being dispensed from printer 26 or on a pre-paid form or sweepstakes entry form being inserted through slot 11. Thus, the same scanner 19 is used for both the function of illuminating and reading a machine-readable indicia disposed on a dispensed certificate from printer 26 or illuminating and reading a machine-readable indicia disposed on a form inserted through slot 11. In an alternate embodiment, guide 27 may have an arcuate shape. Furthermore, in an alternate embodiment, slots 11 and 18 may form a common slot.

In a preferred embodiment, a sensor 9 is installed within the housing of dispensing device 10 to sense the insertion of the form into input slot 11. Sensor 9 works in conjunction with scanner 19 by activating scanner 19 upon sensing the presence of the form into input slot 11. In this manner, scanner 19 can remain off until needed, thereby increasing the overall life of scanner 19. Sensor 9 is positioned within the housing of dispensing device 10 above the portion of input slot 11 which extends into the housing. An appropriate sensor 9 can shine a beam 37 of infrared light down towards an opening 35 in input slot 11. When a form is inserted into input slot 11, opening 35 is blocked, thereby permitting the infrared light to reflect off the form back toward sensor 9, which then activates scanner 19. Input slot 11 may also include barcode indicia disposed on the underside of the top surface 41 of input slot 11 such that it is aligned with the path of beam 33 projecting from scanner 19. Based on whether scanner 19 is able to read the barcode indicia disposed on input slot 11, it can be determined if input slot 11 is blocked, as well as if scanner 19 is operating properly.

In the case where the certificates are pre-printed with barcoded indicia they must be oriented so that the barcoded indicia faces down when the certificates are dispensed. Likewise, the indicia on the pre-ordered forms and sweepstakes entry forms must face down when inserted into input slot 11. Preferably, the user is instructed on the proper orientation, either through a plaque (not shown) above input slot 11 or via a message displayed on monitor 12. It is to be understood, however, that the positions of scanner 19 and sensor 9 may be interchanged without affecting the operation thereof.

Figure 4:
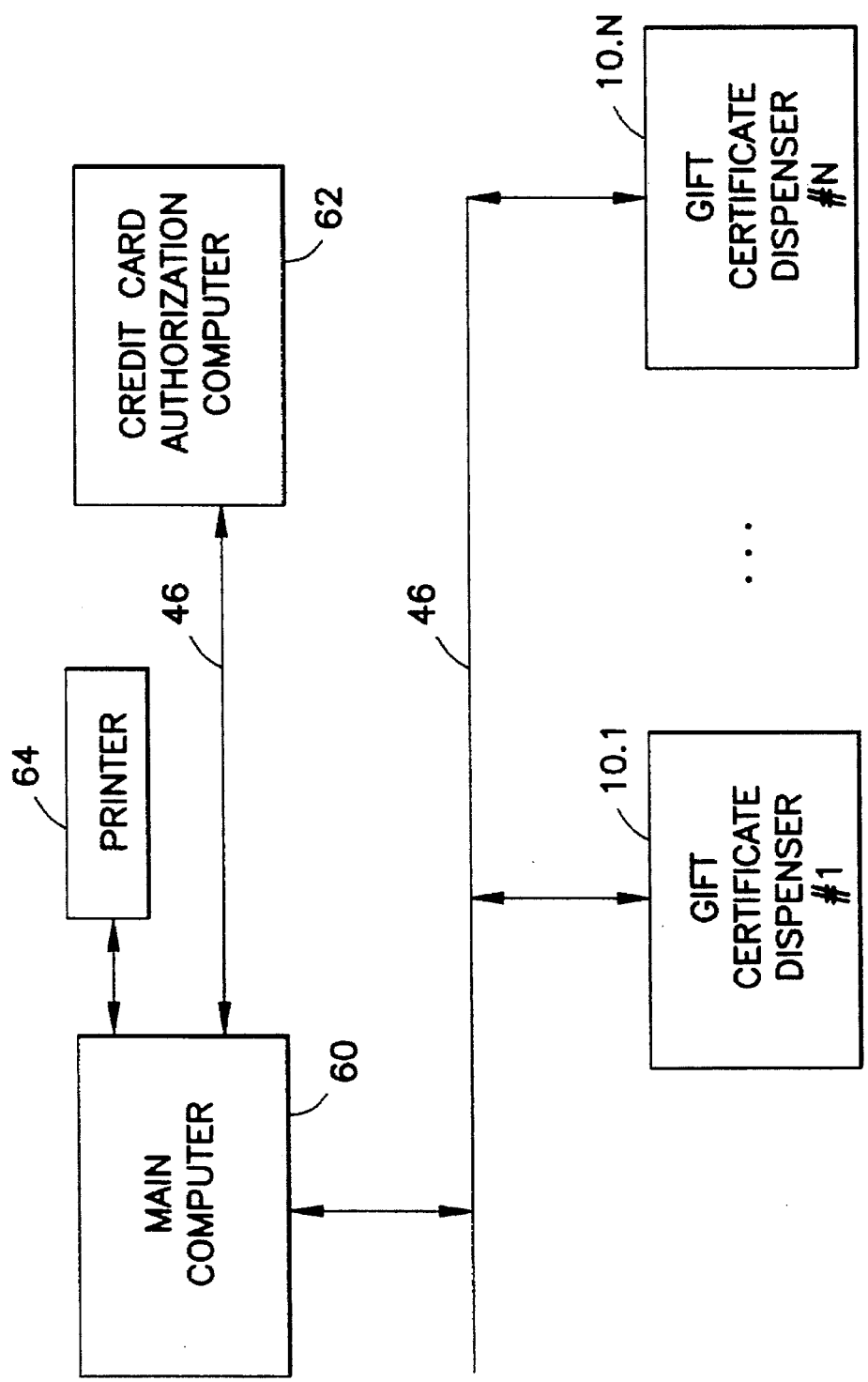
FIG. 4 is a block diagram representation of a network of certificate dispensers controlled by a main computer and one or more credit card authorization computers according to the present invention.

Gift certificate dispensing device 10 can operate independently or within a network. FIG. 4 is a block diagram representative of a network of gift certificate dispensing devices 10 coordinated by a main computer 60. In FIG. 4, gift certificate dispensing devices 10.1 through 10.N are connected through public telecommunications channel 46 to main computer 60. Main computer 60 is connected to a printer 64 for printing transactions either as they occur or as a batch at predetermined time intervals. Main computer 60 is also connected through public telecommunications channel 46 to one or more credit card authorization computers 62 through channel 46 to validate credit card transactions made through these devices. In the preferred embodiment, main computer 60 is a PC compatible computer.

Networked operation of the dispensing devices is preferred since it eases the requirement for local security. In the preferred embodiment, a number of gift certificate dispensing devices are connected by telephone to a main computer. The main computer can poll dispensing devices to determine if a dispensing device has been disconnected or has lost power, can execute diagnostic tests remotely to expedite detection of hardware failure, and can monitor devices for unauthorized access or vandalism.

The gift certificate dispensing device of the present invention, however, provides additional measures for ensuring its secure operation. One such measure is an identification and tracking system for keeping track of certificates as they are distributed to and dispensed by dispensing devices on the network. It will be assumed for the purposes of the following discussions that all blank certificates distributed to dispensing devices 10.1 through 10.N are preprinted with machine-readable indicia in the form of a barcode individually identifying each certificate. For aesthetic purposes, the indicia is preferably disposed on the back side of each certificate. No two certificates use the same barcoded indicia. Typically, these certificates are prepared and sold in a pack with the barcoded indicia increasing in sequential order from the first certificate to the last certificate in the pack. Preferably, a cover sheet is included with the pack which has the barcoded indicia of the first and last certificate disposed thereon.

Before the blank certificates are distributed to each location, the barcoded indicia of each certificate is entered into and stored within a data file in computer 60. At each location, before the packs of certificates are loaded into laser printer 26 by authorized personnel, the barcoded indicia of each of the certificates in the pack must be entered into the device.

Figure 5:
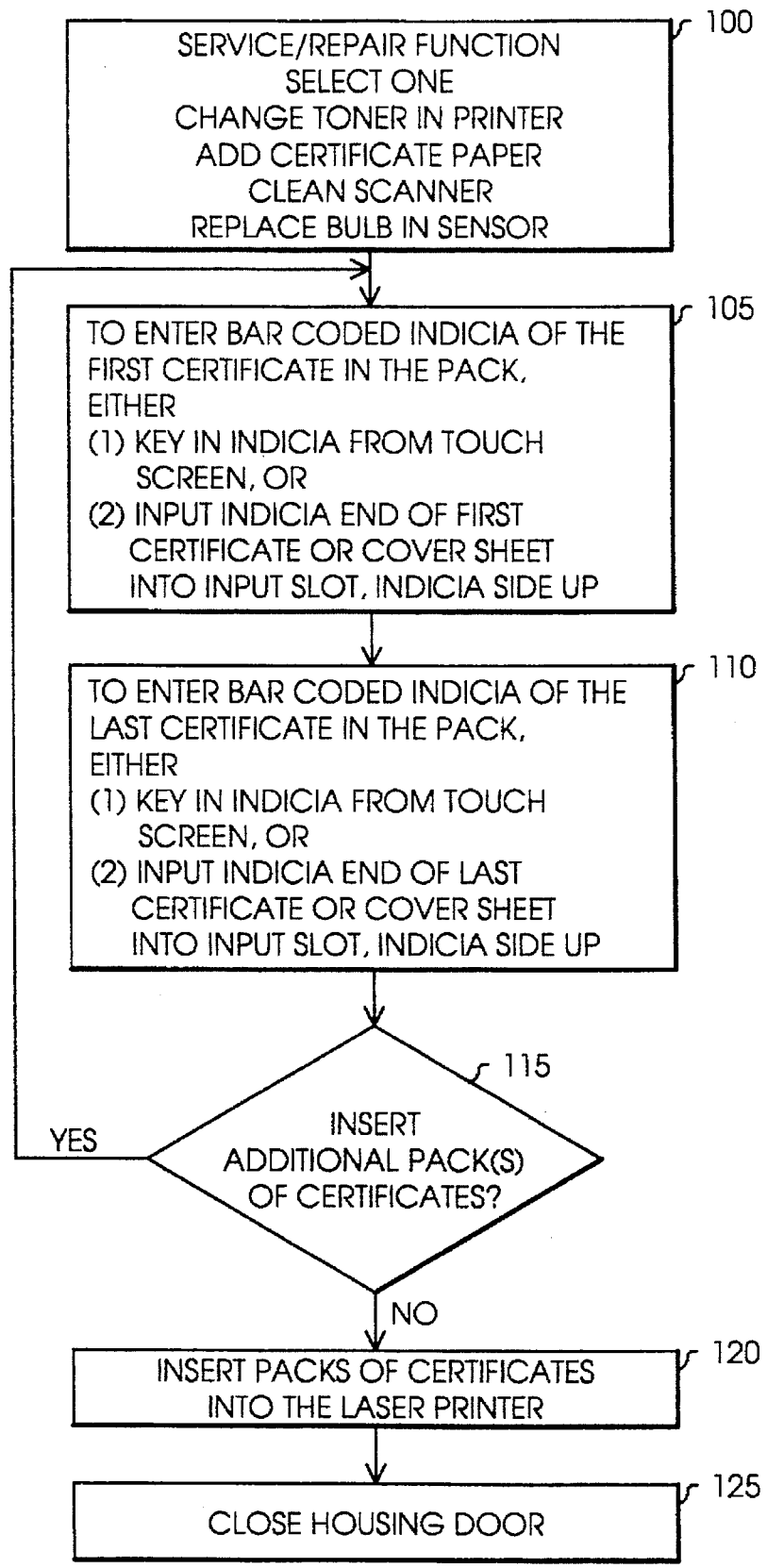
FIG. 5 is a flow chart representation of the screen images that are displayed when blank certificates need to be loaded into the dispenser.

FIG. 5 illustrates the series of representations of screen images that are displayed on monitor 12 once authorized personnel gain access to the interior of the housing of the device. At 100, a prompt is displayed on monitor 12 instructing the user to select from a menu of service and repair options. These options include an "Add Certificate Paper" option. Upon selecting the "Add Certificate Paper" option, a prompt is displayed at 105 instructing the user either to (1) key in the barcoded indicia of the first certificate in the pack, (2) insert the barcoded indicia end of the first certificate into input slot 11, or (3) insert the barcoded indicia of the first certificate on the cover sheet into input slot 11. If the first option is selected, the information keyed in is transmitted directly to computer 24. If the second or third options are selected, scanner 19 scans and reads the indicia and then transmits the information to computer 24. Upon entering the barcoded indicia of the first certificate, a prompt is displayed at 110 instructing the user to either (1) key in the barcoded indicia of the last certificate in the pack, (2) insert the barcoded indicia end of the last certificate into input slot 11, or (3) insert the barcoded indicia of the last certificate on the cover sheet into input slot 11. Again, if the first option is selected, the information is directly transmitted to computer 24. If the second or third option is chosen, scanner 19 scans and reads the indicia and then transmits the information to computer 24. At 115, a prompt is displayed asking the user whether more packs of certificates are to be inserted. If so, steps 105–115 are repeated until no more packs are to be added. At 120, a prompt is displayed instructing the user to insert the packs of certificate into the printer. Preferably, the user is told the manner in which the pack should be oriented (i.e., face-side up, underneath or on top of existing certificates, etc.). At 125, a prompt is displayed instructing the user to close the housing door.

Figure 6:
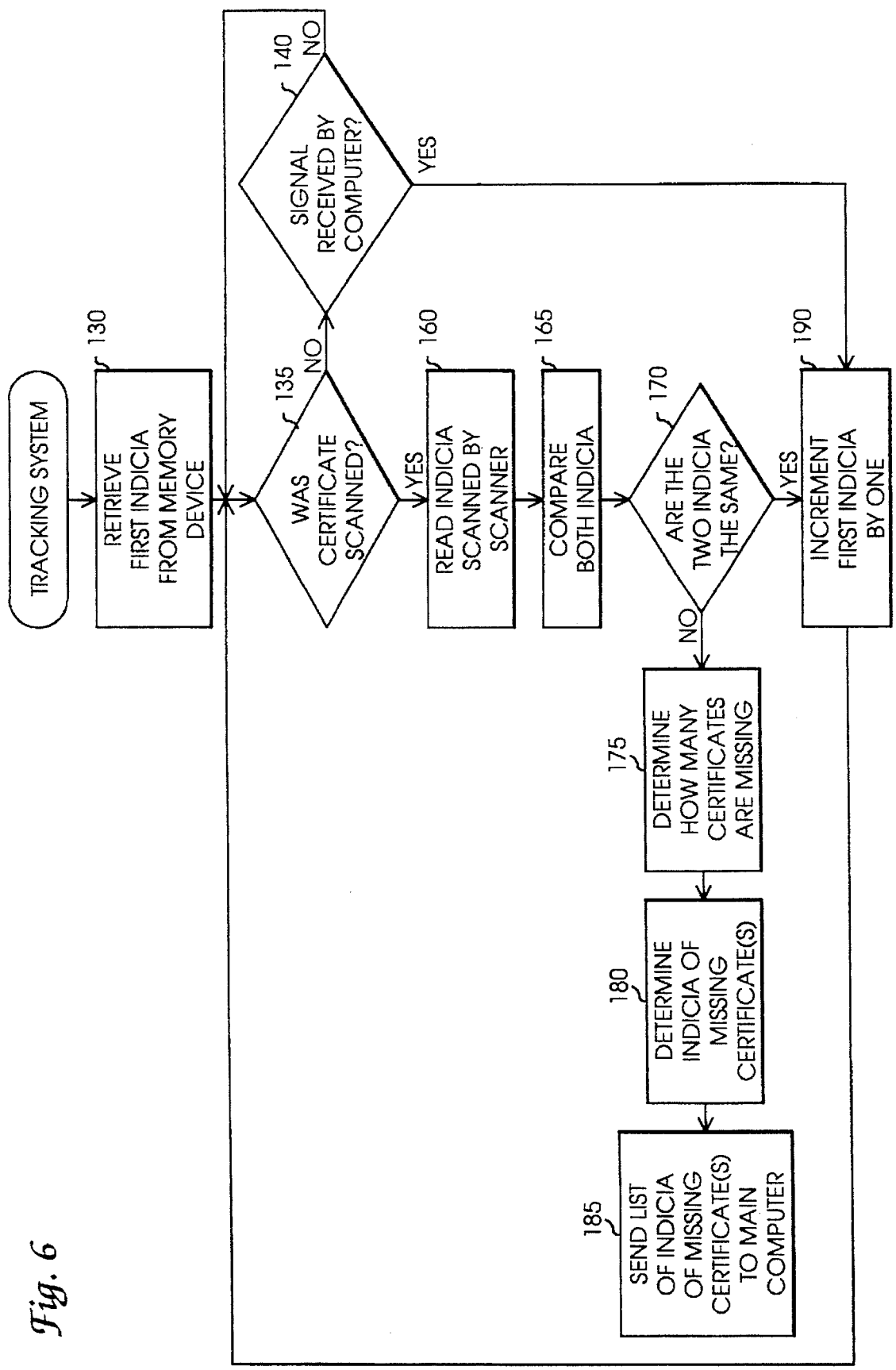
FIG. 6 is a flow chart program representing the tracking system according to the present invention.

The information transmitted to computer 24 during the loading process is stored as a sequence in memory device 28, and is also sent to computer 60 in order to identify and track the certificates. FIG. 6 illustrates the control flow program representing the tracking system of the present invention. At 130, in response to a user entering his gift choices and making the appropriate payment, computer 24 retrieves the first indicia from the sequence stored in memory device 28. At 135, a check is made to determine whether the certificate dispensed by laser printer 26 was scanned by scanner 19. Scanner 19 may not have been able to scan the indicia of the certificate dispensed either because it was traveling too fast along guide 27 or because the barcoded indicia was not well defined. If the certificate was scanned, computer 24 receives and reads a signal from scanner 19 representative of the barcoded indicia scanned. At 165, computer 24 compares the indicia retrieved from memory device 28 with that scanned by scanner 19. At 170, a check is made whether the two indicia are the same. If the indicia are the same, no certificate is missing, and at 190, computer 24 increments the next indicia in sequence by one. Computer 24 repeats steps 135–190 until the two indicia compared at 165 are found not to be the same at 170.

If the certificate was not scanned because it was traveling too fast or because the barcoded indicia was not well defined, scanner 19 sends a signal to computer 24 to that effect. At 140, a check is made to determine whether such a signal was received by computer 24. If not, the certificate has not yet been dispensed and computer 24 repeats step 135, either until a certificate is scanned or until a signal is received by computer 24 indicating one of the two above-mentioned conditions. If computer 24 does receive such a signal, computer 24 advances to step 190 to increment the first indicia to reflect the fact that a certificate was in fact not missing. Preferably, computer 24 still sends a signal to computer 60 when a certificate is not read so that the event may nevertheless be recorded. A repeated occurrence of such an event could indicate that the scanner is not functioning properly.

If the indicia compared at 165 are different, at 175 computer 24 first determines how many certificates are missing (i.e., the difference between the value of the two indicia). Then, at 180, based on the current value of the indicia set by computer 24, the computer determines the actual indicia of the missing certificate(s). At 185, computer 24 sends a signal to computer 60 representing the indicia of each missing certificate. Based on the indicia received from computer 24, computer 60 records the location of the dispensing device involved, and displays an error message on its monitor indicating theft has occurred.

In an alternate embodiment, the blank certificates stored within printer 26 are not pre-printed with barcoded indicia. Rather, printer 26 prints the barcoded indicia on each certificate upon receiving the user's selection of a gift amount and a purveyor, and upon verification of the payment received by the user. Each time a certificate is printed, it is dispensed along guide 27 and scanned by scanner 19. Scanner 19 sends a signal representative of the barcoded indicia disposed there to computer 24 for storage. In this manner, only those certificates having barcoded indica identical to one of those stored in computer 24 may be redeemed.

As previously mentioned, barcode indicia may be disposed on the underside of top surface 41 of input slot 11 to help determine whether input slot 11 is blocked, as well as whether scanner 19 is operating properly (see FIG. 3B). The barcode indicia on input slot 11 is of a different type than that disposed on the certificates and forms. Accordingly, computer 24 is programmed to send a signal to scanner 19 to set scanner 19 to read the type of barcode indicia disposed on input slot 11. Computer 24 then sends a signal to scanner 19 to turn it on. If scanner 19 is able to read the barcode indicia, it sends a signal back to computer 24 to that effect (i.e. the input slot 11 is clear and the scanner is functioning properly). If scanner 19 cannot read the barcode indicia, either because input slot 11 is obstructed or because scanner 19 is not functioning properly, a signal is sent to computer 24 indicating that one of these conditions may have occurred. This signal is then transmitted to main computer 60 where an error message to that effect is displayed. Once input slot 11 and scanner 19 have been tested, computer 24 sends a signal back to scanner 19 to reset scanner 19 to read the type of barcode indicia disposed on the certificates and forms. Computer 24 may be programmed to make such checks periodically.

Each purchase made through gift certificate dispensing devices 10.1 through 10.N is accumulated in and processed by computer 60. Requests for payment (debits to credit card accounts) for those purchases are either submitted electronically through public telecommunications channel 46 and main computer 60 to computer 62 or submitted as a bill printed from printer 64. In a like manner, merchants are notified of purchases of gift certificates issued in their name and of the code numbers of the certificates issued either through channel 46 or through a report printed by printer 64.

Figure 7:
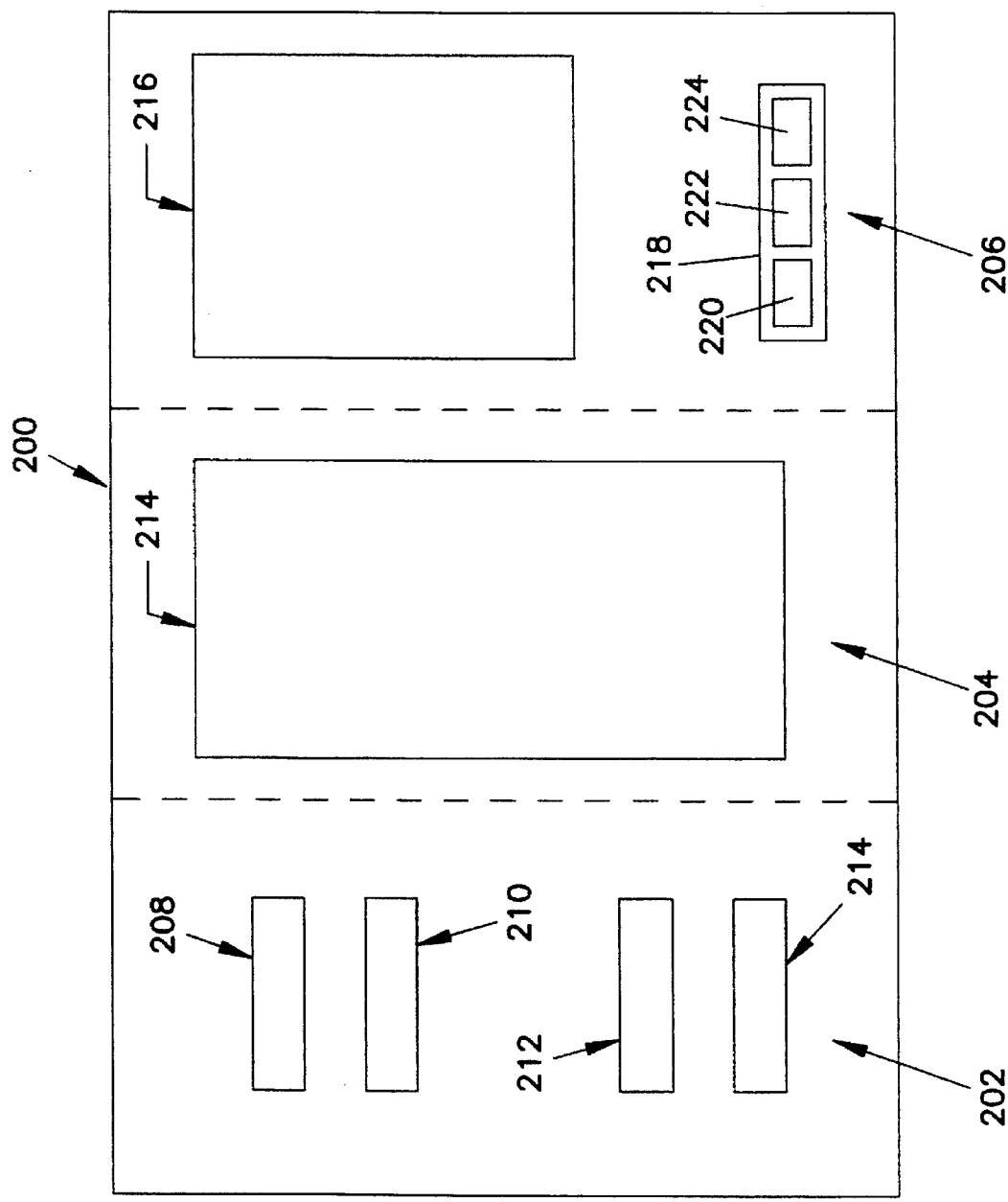
FIG. 7 is a representation of a pre-paid form.

Some of these purchases, however, are made in advance of the certificate being issued by the dispenser (i.e., pre-ordered certificates). A representation of a form 200 representing a pre-ordered gift certificate is shown in FIG. 7. Form 200 is a standard size sheet of paper and may be divided into three sections 202, 204, and 206. If divided, section 202 provides identifying information, such as the name of the recipient at 208, the purchaser at 210, the gift amount at 212, and preferably a greeting at 214. Sections 204 and 206 list the various purveyors available from the gift certificate vendor at 214 and 216, respectively. Section 206 also includes a barcoded indicia at 218 for identification purposes. The barcoded indicia is composed of an account number at 220, an order number at 222, and a sequence number at 224. Sequence number 224 is preferably randomized or encoded in order to minimize the chances that someone might guess valid barcoded indicia.

Recipients of such forms obtain their gift certificate from dispensing device 10 by inserting the barcoded indicia at 218 into input slot 11. This is accomplished by first folding back section 202 against the back of section 204, and then folding section 204 back against the back of section 206 or folding section 206 back against the back of section 204.

Figure 8:
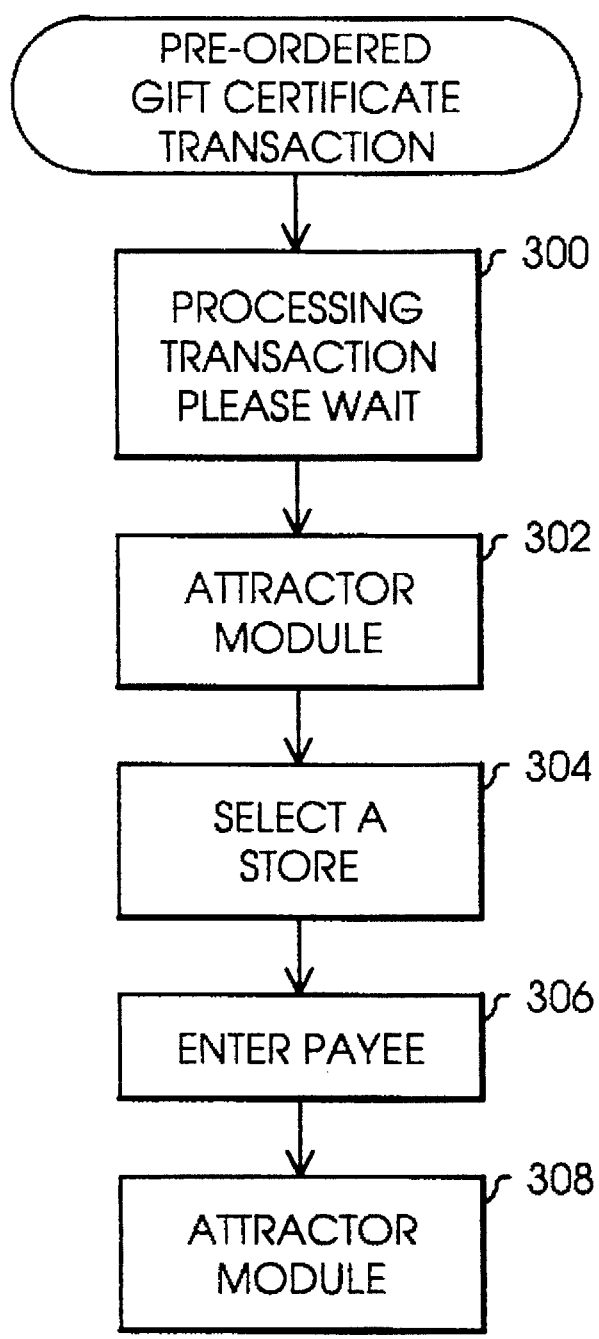
FIG. 8 is a flow chart representation of the screen images that are displayed when a user inserts a pre-paid form through the input slot of the dispenser.

FIG. 8 illustrates the series of representations of screen images that are displayed on monitor 12 once form 200 is inserted into input slot 11. At 300, a prompt is displayed on monitor 12 telling the user that the transaction is being processed. While dispensing device 10 is processing the transaction, at 302, computer 24 begins to display a sequence of displays on monitor 12. The sequence of displays is intended to familiarize the user with the gift certificate product itself and with the method used to purchase a gift certificate. These sequences are collectively referred to as an Attractor Module which is shown and described in U.S. Pat. No. 5,234,174. The screens from the Attractor Module continue to be displayed until processing is complete. If the barcoded indicia is valid (i.e., exists in the data file of computer 60 and has not yet been redeemed), at 304 a prompt is displayed instructing the user to select a store. The user is provided with a variety of shopping options, such as by store type or geographic area. The screen images displayed during the selection of a store are set forth in U.S. Pat. No. 5,243,174. At 306, a prompt is displayed asking the user to enter the name of the payee. Once the user selects a store and enters the name of the payee, at 308 monitor 12 continues to display screens from the Attractor Module while the user waits for the certificate to be printed and dispensed. If the barcoded indicia is not valid, the user is preferably provided with a message to that effect on monitor 12 (not shown).

Figure 9:
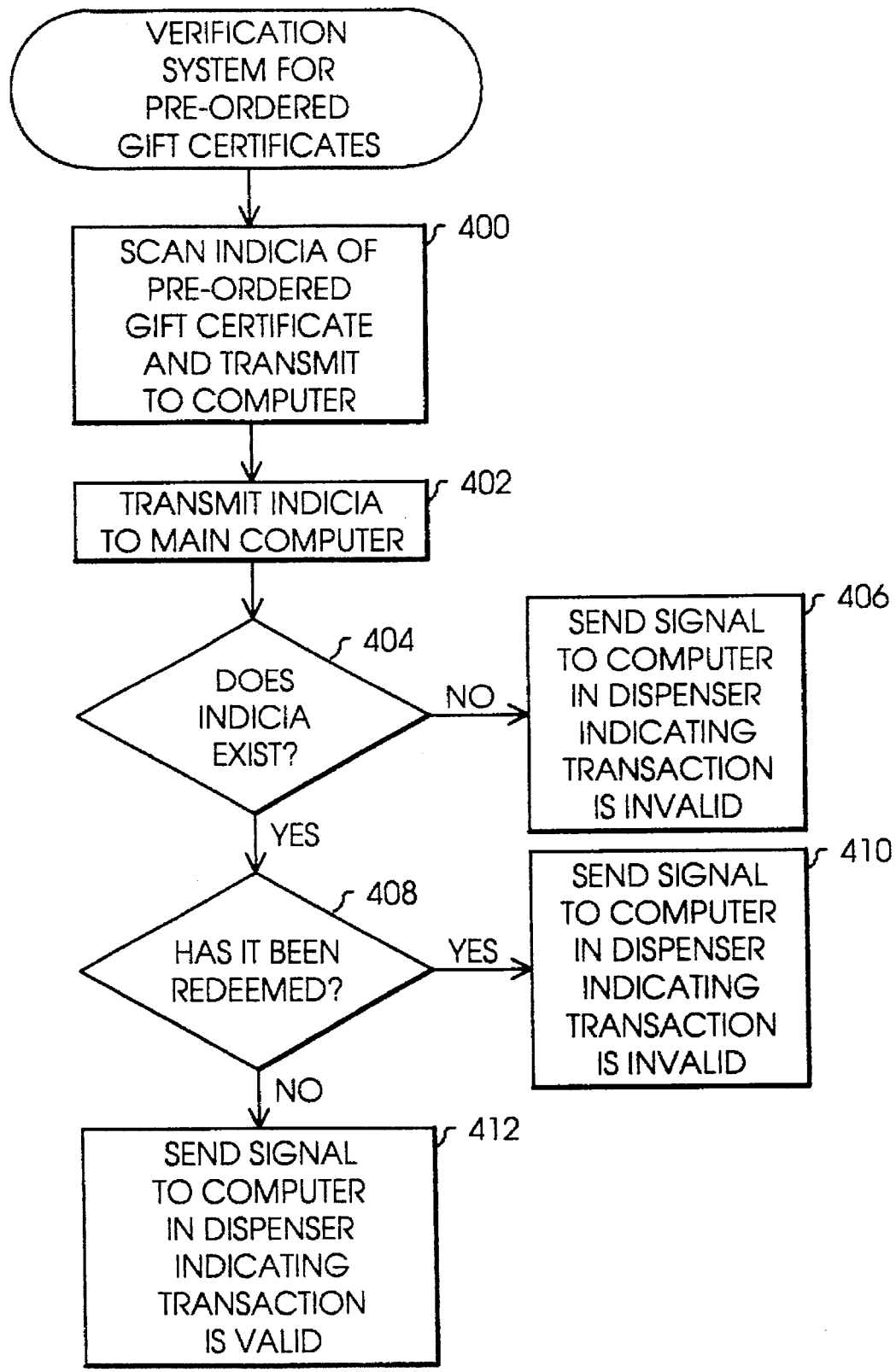
FIG. 9 is a flow chart program representing the verification system for pre-paid forms.

FIG. 9 illustrates the control flow program representing the verification system for the above-mentioned pre-ordered gift certificate transaction. At 400, scanner 19 scans and reads the barcoded indicia disposed on form 200 and transmits the data to computer 24. At 402, computer 24 transmits the data over telecommunications channel 46 to main computer 60. At 404, a check is made to determine whether the barcoded indicia exists within the data file of computer 60. If the indicia does not exist, at 406 computer 60 sends a signal back to computer 24 that the transaction is invalid. If the indicia exists, at 408 a check is made to determine whether a certificate having that barcoded indicia has already been redeemed. If so, at 410, main computer 60 sends a signal back to computer 24 of the dispensing device indicating that the transaction is invalid. If not, at 412 main computer 60 sends a signal back to computer 24 indicating the transaction is valid and allowed.

Dispensing device 10 can also be used as a sweepstakes device. This transaction is similar to that described for pre-ordered gift certificates. In particular, a user inserts a sweepstakes entry form having barcoded indicia disposed thereon into input slot 11. As with the pre-ordered gift certificate transaction, a sequence of displays appears on monitor 12 in order to familiarize the user with the gift certificate product itself and with the method used to purchase a gift certificate while the user is waiting for the device to determine whether or not he or she has a winning form. Once the transaction has been processed, a message is displayed on monitor 12 indicating whether the user is a winner, and if so, displays messages about the prize, such as what it is and how to obtain it.

The control flow program representative of the sweepstakes application is likewise similar to that shown in FIG. 9. In summary, the barcoded indicia scanned by scanner 19 is transmitted to computer 24 which then transmits it to main computer 60 to determine whether the barcoded indicia represents a winning sweepstakes entry. Main computer 60 then sends a signal back to computer 24 indicating the status of the entry form (i.e. winner or loser).

It should be apparent that the foregoing description is only illustrative of the invention and is not intended to limit the scope of the coverage. For example, while the routines are shown for a networked environment, it should be obvious to one skilled in the art that these routines are readily adaptable to independent operation of a gift certificate dispensing device. Thus, various changes to the form, details, and arrangement of the disclosed device may be made without departing from the spirit of the invention as claimed in the following claims.

What is claimed is:

1. A dispensing apparatus for dispensing a first form negotiable for goods or services having first machine-readable indicia disposed thereon on validation of a second form having second machine-readable indicia disposed thereon, said second form providing at least partial payment for said first form, said apparatus comprising a housing, said apparatus also including means for accepting said second form when said second form is inserted from outside said housing into said housing and means from inside said housing for dispensing said first form, said dispensing means and said accepting means having a common machine-readable indicia scanner for reading said first and second indicia, said apparatus further including means for processing information from said first machine-readable indicia to identify a security problem and means for validating said second indica before allowing said accepting means to accept said second form in at least partial payment for said first form.

2. A method for dispensing a certificate having a first machine-readable indicia disposed thereon from a dispensing apparatus in response to receiving a payment from a user, the payment being in the form of cash, a card having magnetically coded data disposed thereon, or upon insertion of a form having a second machine-readable indicia disposed thereon, the apparatus having a sensor, a printing means, a dispensing means, a scanner, and a control means, the method comprising the steps of:

activating the scanner in response to the sensor sensing the presence of the form inserted in the apparatus;

scanning the second indicia on the form with the scanner;

verifying through the control means that the second indicia scanned by the scanner is valid to enable issuing of the certificate; and activating the printer means upon verification by the control means of the payment received;

dispensing the certificate after it has been printed by the printer means, said dispensing step including scanning the first indicia with the scanner as the printed certificate is dispensed by the dispensing means;

determining through the control means whether a security investigation needs to be made based on the first indicia of each certificate scanned by the scanner being in proper sequence or not.

3. The method of claim 2, further comprising the step of generating through the control means an error output signal when the second indicia scanned by the scanner cannot be validated.

4. The method of claim 2, wherein the step of determining comprises the steps of:

receiving the first indicia of the first and last certificates of a plurality of certificates stored within the housing;

creating through the control means a list of the first indicia of each certificate in the plurality of certificates stored within the housing in sequential order;

reading through the control means the first indicia from the list of first indicia created by the control means, in order, each time a certificate dispensed by the dispensing means is scanned by the scanner;

comparing the first indicia of the certificate scanned by the scanner with the first indicia read by the control means each time a certificate is scanned by the scanner; and detecting through the control means a difference between the indicia scanned by the scanner and the indicia read through the control means, any difference from being identical representing a gap in the sequence of the first indicia of the plurality of certificates stored within the housing, so that a missing certificate can be identified.

5. A new dispensing apparatus for an item of value having first machine-readable indicia on validation of a form having second machine-readable indicia disposed thereon, said form providing at least partial payment for said item of value, said apparatus comprising;

a housing;

means for receiving said form as at least partial payment for said item of value, said payment receiving means including a scanner within said housing for reading said machine-readable indicia, said housing having a wall and said receiving means including a slot in said wall;

means within said housing for sensing physical presence of said form;

means for activating said scanner when the physical presence of said form is sensed by said sensing means;

means for validating said machine-readable indicia read from said form by said scanner;

means for dispensing said item of value after said machine-readable indicia is validated by said validating means, said dispensing means including means for guiding said item of value and said form so that said first indicia is scanned by said scanner as said item of value is dispensed by said dispensing means and so that said second indicia is scanned by said scanner when a portion of said form is inserted through said slot; and means for processing information from said first machine-readable indicia to identify a security problem.

6. The dispensing apparatus of claim 5, wherein a plurality of items of value are stored within said housing and the information processing means further comprises error means for providing an error output signal when an unverified first indicia is detected.

7. The dispensing apparatus of claim 6, wherein the error means comprises:

first program means responsive to the scanner for creating and storing a sequentially ordered list of the first indicia for the items of value stored within the housing to create first program output signals;

second program means for reading the first indicia when one of the items of value is dispensed by said dispensing means to create a second program output signal;

means for comparing the second program output signal to an appropriate one of the first program output signals; and detection means responsive to the comparing means for detecting a difference between the second program output signal and the appropriate one of the first program output signals;

wherein the difference represents a gap in sequence of the first indicia of the items of value stored within the housing, so that a missing one of the items of value can be identified to indicate the security problem.

8. The apparatus of claim 5, wherein said first and second machine-readable indicia are first and second barcodes, respectively.

9. The dispensing apparatus of claim 5, wherein said information processing means comprises:

a programmable first computer connected to said scanner and said dispensing means, said programmable first computer being configured to receive and store validation information for said first and second machine-readable indicia.

10. The dispensing apparatus of claim 9, further comprising a programmable second computer having nonvolatile data storage means for storing the validation information representing the form, and means for providing communication between the first and second computers to validate the information from said second machine-readable indicia.

11. The dispensing apparatus of claim 10, wherein the second computer comprises program means for adding redemption status information to the validation information stored by the second computer upon verification of the form by the first computer.

12. The apparatus of claim 5, wherein said guiding means extends through an opening in the wall of said housing, said opening being spaced from said slot.

13. The apparatus in accordance with claim 5 wherein said sensing means includes a source of infrared light and a sensor of infrared light.

14. The apparatus in accordance with claim 5 including a test barcode indicia aligned so that when said scanner reads said test barcode indicia it can be verified that said scanner is operating properly.

\* \* \* \* \*